March 4, 1969 J. C. COOKERLY ET AL Re. 26,533

TONE GENERATION SYSTEM

Original Filed Nov. 20, 1961

INVENTORS
JACK C. COOKERLY
GEORGE R. HALL
BY Elliott & Pastoriza
ATTORNEYS

United States Patent Office

Re. 26,533
Reissued Mar. 4, 1969

26,533
TONE GENERATION SYSTEM

Jack C. Cookerly, 7655 Atoll Ave., North Hollywood, Calif. 91605, and George R. Hall, 13613 Huston St., Sherman Oaks, Calif. 91403

Original No. 3,213,180, dated Oct. 19, 1965, Ser. No. 153,467, Nov. 20, 1961. Application for reissue Oct. 12, 1967, Ser. No. 676,663

Matter enclosed in heavy brackets [ ] appears in the original patent but forms no part of this reissue specification; matter printed in italics indicates the additions made by reissue.

U.S. Cl. 84—1.16 11 Claims
Int. Cl. G10h *3/00*

*ABSTRACT OF THE DISCLOSURE*

*A musical instrument such as a guitar includes transducer means responsive to the playing of the guitar for supplying an electrical A.-C. signal of an amplitude which is a function of the playing. This A.-C. signal in turn is passed through wave shaping circuits which convert the signal into an output signal of a desired wave shape and of a given frequency derived from the frequency of the original A.-C. signal. The amplitude of this output signal is normally constant as a result of the type of wave shaping circuits employed and the various divisions or multiples generated of the original frequency of the A.-C. signal. Therefore there is required a means for varying the amplitude of the final output tone derived from the output signal from the wave shaping circuits in accord with original amplitude variations resulting from the playing of the instrument. This means takes the form of a means responsive to the amplitude of the A.-C. signal to provide a control voltage which is a function of the amplitude. Control circuit means responsive to this control voltage connect to a suitable reproducing means for the control signal to vary the amplitude of the output tone in accordance with the playing of the instrument.*

This invention relates to tone generation systems and more particularly to such systems for providing different output tones derived from the normal sound generated by a known instrument.

Tone generation systems as employed with organs, for example, are well known in the art. In the case of electric organs, the tone generation system is completely artificial in that the only function of the operator is to actuate an oscillating circuit for generating the tone. Thereafter, the quality or characteristics of the tone are determined by the circuitry employed in the instrument.

Other tone generating systems essentially constitute audio amplifiers for amplifying the known sound provided by the instrument. An electric guitar is an example of this latter type of instrument wherein the operator must be a skilled musician. The resultant tones from the guitar, however, are merely amplified versions of the normal sound of the instrument.

With the foregoing systems in mind, it is a primary object of the present invention to provide a novel tone generation system in which output tones are derived from the normal sound of the instrument but in which such output tones may have an entirely different quality so that the known instrument may be used to generate tones sounding completely different from those characterizing the instrument.

More particularly, it is an object to provide a tone generation system in which the final output tone, while different in quality from the natural tone of the instrument, is nevertheless characterized by the manner in which the initiating natural tone of the instrument is played by the musician to the end that control over the final output tone is still retained by the musician, although the quality thereof is considerably varied.

A more general object of this invention is to create musical tones of wide variety and quality which are completely controlled by a known musical instrument and in which the created tones constitute musical tones of entirely different quality from those associated with the controlling instrument.

Briefly, these and many other objects and advantages of this invention are attained by providing transducer means for converting the normal sound of a known instrument into an A.-C. signal. This A.-C. signal in turn is converted by suitable wave shaping circuit means into an output signal having a given wave form and frequency characteristic. The output signal is then reproduced by conventional amplifier and loudspeaker means to provide the desired output tone, which tone has a characteristic determined by the generated wave shape and frequency within the wave shaping circuits.

A further feature of the invention resides in a control means for varying the volume of the output signal from the wave shaping circuits in a manner corresponding to the variation in volume of the natural tone of the originating instrument to the end that the finally reproduced output tones vary in volume in accordance with the manner in which the instrument is played by a musician.

The particular wave shaping circuit means employed in the system may include by way of example, square wave generators, pulse generators, frequency doublers, and frequency dividers. There may thus be provided a plurality of different types of output signals and by employing selective switching means, a desired selection of the output signals may be made so that the particular musical instrument may be employed to reproduce tones having the characteristics of a different musical instrument.

A better understanding of the invention will be had by now referring to one embodiment thereof chosen merely by way of illustrative example as shown in the accompanying drawings, in which.

Figure 1:
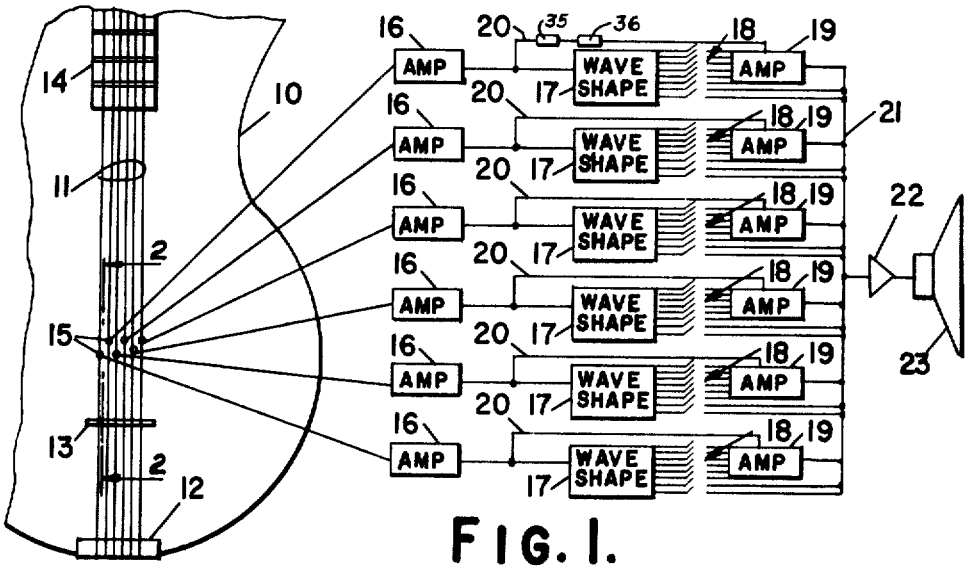
FIGURE 1 is a block and fragmentary view of a musical instrument useful in explaining the general principles of the system.

In the one embodiment chosen for illustrative purposes, the originating or known instrument constitutes a guitar 10 as illustrated in FIGURE 1. It is to be understood, however, that any other type of musical instrument employing physically vibrating elements could be used.

As shown in FIGURE 1, the guitar includes the conventional six strings 11 secured to the base portion of the guitar body as at 12. A conventional bridge 13 is shown spaced from the base and a portion of the finger board 14 is illustrated in fragmentary form at the upper end of the drawing.

In accordance with the tone generation system of the invention, there are provided a plurality of transducer means 15 disposed adjacent to the strings 11, preferably directly thereunder as shown. Each of these transducer means functions to convert the normal sound as generated by the physical motion of the strings into an A.-C. signal of proportional amplitude. There is thus a specific A.-C. signal associated with each of the strings 11 when the same are played.

The various A.-C. signals from the transducers 15 pass through amplifiers 16 to provide amplified A.-C. signals also proportional in amplitude to the amplitude of the particular strings. These A.-C. signals are passed into wave shaping circuit means as indicated at 17 wherein they are converted into various output signals. In the particular embodiment chosen for illustrative purposes, there are provided switch means 18 enabling selection of any one of the various outputs to pass the same into amplifier means 19. A control means 20 connects from the output of each amplier 16 to the corresponding amplifier means 19. The output from the amplifier means 19 passes to a common output bus line 21 and thence through a conventional reproducing means including the power amplifier 22 and loudspeaker 23. The control means 20 are responsive to the amplitude of the A.-C. signal from the amplifiers 16 and are connected as shown to the amplifier means 19 to control the bias thereof and thus control the amplitude of the output signals so that this amplitude will vary in the same manner as the amplitude of the original natural tone of the vibrating strings 11.

Figure 2:
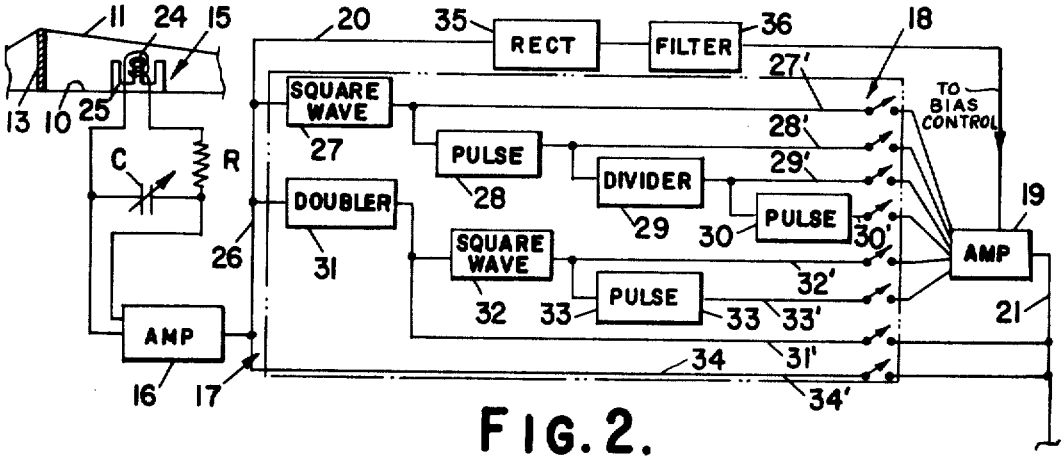
FIGURE 2 is another block diagram illustrating in detail one type of wave shaping circuit configuration as might be employed in the embodiment of FIGURE 1 and, FIGURE 3 illustrates by way of example a series of wave forms which characterize various output signals provided by the system of FIGURE 1.

Referring now to FIGURE 2, there is shown one type of transducer, wave shaping circuit arrangement and control circuit typical of each transducer 15, block 19, and control circuit 20 shown in FIGURE 1.

Thus, referring to the upper lefthand portion of FIGURE 2, the guitar string 11 and bridge 13 are shown in side view cross section in the direction of the arrows 2—2 of FIGURE 1 together with one of the transducers 15 disposed thereunder. This transducer may include a simple pickup coil 24 formed on a magnetic circuit 25 which would include a permanent magnet. The proximity of the metallic string 11 will vary the reluctance of the magnetic circuit 25 so that the varying flux cutting the coil 24 will provide an output signal in response to movement or motion of the string 11.

As shown, the coil 24 is shunted by a condenser C which is variable so that there is provided a "tank" circuit which may be tuned to the fundamental frequency of the string 11. A small resistance R may be included in the tank circuit to lower the Q thereof sufficiently so that the circuit will be broadly tuned over a desired range of frequencies, for example, at least two octaves. This is desirable since each of the strings may be played over a scale of at least two octaves, depending upon the fingering on the finger board 14 of FIGURE 1.

The output of the transducer 15 is amplified by the amplifier 16 as described to provide an A.-C. signal on a line 26 shown in FIGURE 2. This signal will have an amplitude proportional to the original amplitude of the vibrating string 11.

The wave shaping circuit means typical of each block 17 in FIGURE 1 is shown in detail in FIGURE 2 within the dash-dot lines 17. This circuit includes a square wave generator 27 connected to receive the A.-C. signal from the line 26. The output of the square wave generator 27 passes directly through a line 27' to the selective switching means 18.

Also connected to the output of the square wave generator 27 is a pulse generator 28 which may comprise a simple differentiating circuit to differentiate the leading and trailing edges of the square wave to provide pulses. These pulses are also passed to the switch means 18 through a line 28'. A frequency divider indicated at 29 is connected to the output of the pulse generator 28 and passed to the selective switching means 18 through line 29'. The output of the divider 29 will be a square wave of one-half the frequency of the input A.-C. signal on line 26. In addition to this square wave output, there is provided a second pulse generating means 30 for providing a train of pulses on a lead 30' at one-half the frequency of the original signal.

The circuit may include further components to provide additional types of output signals. To this end, there is provided a frequency doubler 31 connected to receive directly the A.-C. input signal from the line 26 and provide an output sine wave signal of double frequency on line 31'. From this frequency doubler, a square wave generator 32 will provide on the line 32' passing to the selective switches 18, a square wave of double frequency. Also, a third pulse generator 33 may receive the double frequency square wave from the generator 32 to provide a series of pulses at 33' of double frequency. An output line 34' extends directly from the line 26 to provide an output sine wave corresponding to the input sine wave from the amplifier 16.

Figure 3:
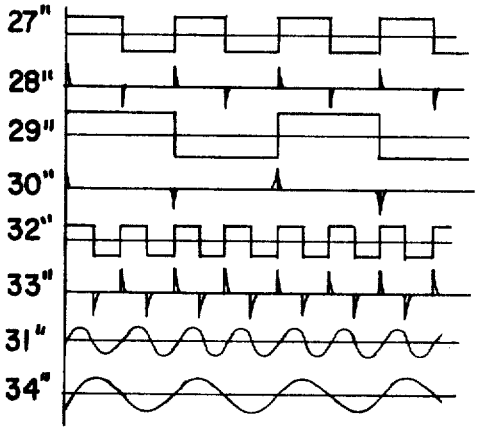

The various wave shapes existing on the lines 27', 28', 29', 30', 32', 33', 31', and 34' are shown successively in FIGURE 3 and are designated by the corresponding numerals followed by a double prime. In the particular examples chosen for illustrative purposes, the square wave 27' when reproduced in the reproducing amplifier 22 and loudspeaker 23 of FIGURE 1 will have a sound similar to a clarinet. Since the frequency of the square wave 27'' is the same as the original A.-C. signal on the line 26 in FIGURE 2, the tone will be exactly the same pitch and will differ in quality only in that it sounds similar to a clarinet rather than a string.

The series of pulses 28'' on the other hand will provide a sound characteristic of string so that the reproduced tone when the selective switching 18 is operated in such a manner to pass the pulses 28'' will be similar to the original tone of the guitar.

Output tones of lower and higher octaves corresponding to the clarinet and a string instrument in turn will be provided by the wave forms 29'', 30'', 32'', and 33'', respectively.

Finally, the sine wave outputs represented by the sine waves 31'' and 34'' will be similar to a flute type note when reproduced. For the wave form 31'' at double the frequency, the flute tone reproduced will be an octave higher than the original tone played on the guitar. For the wave form 34'', the flute tone will be of the same pitch as the originally played note.

Each of the wave shaping circuits 17 illustrated in FIGURE 1 is similar to the one described in FIGURE 2 and each includes a bank of selective switches 18 as shown in FIGURE 2. Thus, it is possible to select any one of the desired output wave forms as illustrated in FIGURE 3, depending upon the quality of the output tone desired.

An important feature of this invention resides in the provision of the control circuit 20 which will pass the original A.-C. signal through a rectifier 35 and filter 36 to provide a D.-C. control voltage at the output thereof. This D.-C. control voltage varies in magnitude in accordance with variations in the amplitude of the original A.-C. signal. As shown, this control voltage is fed to the amplified 19 and may be employed therein to vary the bias of the amplifier 19 such that the output of the amplifier will vary in amplitude in accordance with amplitude variations in the original sound generated by the instrument 10. Thus, by means of this control circuit, the output tone, while of different quality will vary in amplitude in the manner controlled by the musician playing the originating instrument. This, of course, is entirely automatic and accordingly, manual controls for individual tone volume control are not required.

The operation of the tone generation system will be evident from the foregoing description. Initially, the operator will select a desired type of output tone. For example, if he wishes to simulate a clarinet sound, he will close the selective switch 18 connecting to the output line 27' from the square wave generator 27 as shown in FIGURE 2 in dotted lines. The corresponding switch in each of the wave shaping circuits for the remaining strings of the guitar 10 will similarly be closed, all of the other switches being left open. When the player now strums any one or more of the strings 11 of the guitar 10 of FIGURE 1, various A.-C. signals being converted to square wave form by the corresponding square wave generators in the various wave shaping circuits. The resulting output signal will then be passed to the common bus line 21, reproducing amplifier 22, and speaker 23.

In the event the player wishes to provide an output tone corresponding to a string, the selective switch connected to the lead 28' in FIGURE 2 may be closed and the other corresponding switches in conjunction with the other strings in the other wave shaping circuits shown in FIGURE 1 similarly closed, all remaining switches being left open. If desired, however, two or more of the switches may be closed simultaneously in response to only one vibrating string.

It should be understood, of course, the various wave shaping circuits illustrated are only by way of example. Many other types of wave shaping circuits may be employed to provide output wave forms of given wave shape and frequency to simulate the sounds of other instruments when reproduced.

Further, it should be clearly understood that while a guitar has been illustrated and described as the originating instrument, any other instrument may function in a similar manner.

The tone generation system is accordingly not to be thought of as limited to the one specific example set forth merely for illustrative purposes.

What is claimed is:

1. A tone generation system for providing an output tone of given characteristics from a known instrument having at least one physically vibrating element for generating the normal sound of the instrument, comprising, in combination: transducer means for converting the physical motion of said vibrating element into an electrical A.-C. signal of proportional amplitude; wave shaping circuit means connected to receive and convert said A.-C. signal into an output signal of given wave shape and given frequency; amplifier means for said output signal; reproducing means for converting said output signal into said output tone, said given characteristics of said output tone being determined by said given wave shape and frequency; and, control means responsive to the amplitude of said A.-C. signal to provide a D.-C. control voltage which is a function of said amplitude, said control means being connected to apply said control voltage to said amplifier means to vary the bias of said amplifier means whereby the amplitude of said output signal varies in accordance with the amplitude of said vibrating element.

2. A system according to claim 1, in which said given wave shape constitutes a square wave.

3. A system according to claim 1, in which said given wave shape constitutes a series of pulses.

4. A system according to claim 1, in which said given frequency is twice the frequency of said A.-C. signal.

5. A system according to claim 1, in which said given frequency is one-half the frequency of said A.-C. signal.

6. A system according to claim 1, in which said wave shaping circuit means includes square wave generating means, pulse generating means, frequency doubling means, and frequency dividing means connected to provide a plurality of output signals of different wave shapes and frequencies; and switch means adapted to selectively receive any one of said plurality of output signals to provide said output signal of given wave shape and given frequency and pass the same to said reproducing means.

7. A system according to claim 6, in which said known instrument includes additional physically vibrating elements for generating the normal sounds of the instrument, and additional transducer means, wave shaping circuit means, amplifier means, and control means associated with each of said vibrating elements to provide additional output signals of given wave shapes and frequencies in the same manner as said first mentioned transducer means, wave shaping circuit means, and amplifier means in conjunction with said first mentioned vibrating element, said additional output signals being passed to said reproducing means.

8. A system according to claim 7, in which said vibrating element and said additional vibrating elements constitute strings and said instrument comprises a guitar.

*9. A tone generation system for providing an output tone of given characteristics from a musical instrument, comprising, in combination: transducer means responsive to the playing of said instrument for supplying an electrical A.-C. signal of an amplitude which is a function of the playing of said instrument; wave shaping circuit means connected to receive and convert said A.-C. signal into an output signal of given wave shape and given frequency derived from the frequency of said A.-C. signal; reproducing means including amplifier means for converting said output signal into said output tone, said given characteristics of said output tone being determined by said given wave shape and frequency; means responsive to the amplitude of said A.-C. signal to provide a control voltage which is a function of said amplitude; and control circuit means responsive to said control voltage connected to said reproducing means for varying the amplitude of said output tone in accordance with the playing of said known musical instrument.*

*10. The tone generation system called for in claim 9 in which said wave shaping circuit means is adapted to supply an output signal at a frequency which is twice the signal frequency input thereto.*

*11. The tone generation system called for in claim 9 in which said wave shaping circuit means is adapted to supply an output signal at a frequency which is one-half the signal frequency input thereto.*

References Cited

The following references, cited by the Examiner, are of record in the patented file of this patent or the original patent.

UNITED STATES PATENTS

| | | | |
|---|---|---|---|
| 2,138,500 | 11/1938 | Miessner | 84—1.15 X |
| 2,561,349 | 7/1951 | Earp | 84—1.11 X |
| 3,080,785 | 3/1963 | Evans | 84—1.16 |
| 2,455,575 | 12/1948 | Fender et al. | 84—1.15 |
| 3,006,228 | 10/1961 | White | 84—1.01 |

ARTHUR GAUSS, *Primary Examiner.*

D. D. FORRER, *Assistant Examiner.*

U.S. Cl. X.R.

84—1.11, 1.15, 1.19